United States Patent
Nakamura et al.

(10) Patent No.: US 9,317,035 B2
(45) Date of Patent: Apr. 19, 2016

(54) REMOTE OPERATION SYSTEM

(71) Applicant: Hitachi, Ltd., Tokyo (JP)

(72) Inventors: Ryosuke Nakamura, Tokyo (JP); Azusa Amino, Tokyo (JP); Taishi Ueda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/432,598

(22) PCT Filed: Mar. 15, 2013

(86) PCT No.: PCT/JP2013/057522
§ 371 (c)(1),
(2) Date: Mar. 31, 2015

(87) PCT Pub. No.: WO2014/141479
PCT Pub. Date: Sep. 18, 2014

(65) Prior Publication Data
US 2015/0261218 A1 Sep. 17, 2015

(51) Int. Cl.
*G05D 1/02* (2006.01)
*G05D 1/00* (2006.01)
(Continued)

(52) U.S. Cl.
CPC ............ *G05D 1/0038* (2013.01); *B25J 9/1689* (2013.01); *G05D 1/024* (2013.01); *G05D 1/0214* (2013.01);
(Continued)

(58) Field of Classification Search
CPC ...... B25J 9/1689; E02F 9/205; G05D 1/0038; G05D 1/024; G05D 1/0246; G05D 1/0248; G06T 1/0014; G05B 2219/35506; G05B 2219/40161; G05B 2219/40169
USPC ................................................. 700/250, 255
See application file for complete search history.

(56) References Cited

U.S. PATENT DOCUMENTS 5,046,022 A * 9/1991 Conway ............... G05B 19/427
700/250
5,596,332 A * 1/1997 Coles .................... G01S 5/0009
342/455

(Continued)

FOREIGN PATENT DOCUMENTS

JP 10-275015 A 10/1998
JP 2006-114053 A 4/2006
(Continued)

OTHER PUBLICATIONS

Bejczy, Antal K. et al, "The phantom robot: Predictive displays for teleoperation with time delay", Proceedings of the 1990 IEEE International Conference on Robotics and Automation, May 13-18, 1990, pp. 546-551.*

(Continued)

*Primary Examiner* — Behrang Badii
*Assistant Examiner* — David Testardi
(74) *Attorney, Agent, or Firm* — Mattingly & Malur, PC

(57) ABSTRACT

When a moving body is remotely operated, a delay in transmission of an image and information acquired from the moving body becomes a problem since immediate transmission of an operation to the moving body cannot be expected. When a frame rate is decreased or a resolution is reduced to decrease the amount of image data to prevent transmission delay of the image data, it is difficult to grasp motions of other moving bodies. As a result, when a certain amount of time is required to transmit a camera image and a moving obstacle, the movement of the obstacle and the movement of the moving body are estimated. The estimated image is generated based on a current image, and is presented to an operator via a monitor. Accordingly, it is possible to reduce instability and a risk associated with transmission delay to safely operate the moving body.

11 Claims, 3 Drawing Sheets

(51) Int. Cl.
*G06T 1/00* (2006.01)
*B25J 9/16* (2006.01)
*G06K 9/00* (2006.01)
*G06T 7/00* (2006.01)
*G06T 7/20* (2006.01)

(52) U.S. Cl.
CPC ............ *G05D 1/0246* (2013.01); *G05D 1/0248* (2013.01); *G06K 9/00577* (2013.01); *G06K 9/00805* (2013.01); *G06T 1/0014* (2013.01); *G06T 7/004* (2013.01); *G06T 7/0081* (2013.01); *G06T 7/20* (2013.01); *G05D 2201/0207* (2013.01); *G06T 2207/10004* (2013.01); *G06T 2207/10024* (2013.01); *G06T 2207/20144* (2013.01); *G06T 2207/30261* (2013.01)

(56) References Cited

U.S. PATENT DOCUMENTS

| | | | | |
|---|---|---|---|---|
| 6,845,297 | B2* | 1/2005 | Allard | B25J 9/1689 318/628 |
| 8,139,108 | B2* | 3/2012 | Stratton | G05D 1/0044 348/114 |
| 9,206,589 | B2* | 12/2015 | Price | G08C 17/02 |
| 2005/0119801 | A1* | 6/2005 | Florentin | G05D 1/0022 701/2 |
| 2005/0125150 | A1* | 6/2005 | Wang | B25J 9/1689 701/469 |
| 2007/0165033 | A1* | 7/2007 | Matsuno | G05D 1/0038 345/475 |
| 2010/0153013 | A1* | 6/2010 | Kondo | B63B 49/00 701/301 |
| 2010/0241289 | A1* | 9/2010 | Sandberg | B25J 9/1689 701/2 |
| 2011/0066262 | A1* | 3/2011 | Kelly | G05B 23/0267 700/90 |

FOREIGN PATENT DOCUMENTS

| | | | |
|---|---|---|---|
| JP | 2008-65755 A | 3/2008 | |
| JP | 2010-214479 A | 9/2010 | |
| JP | 2011-28495 A | 2/2011 | |
| WO | WO 9821631 A1 * | 5/1998 | ........... G05D 1/0282 |

OTHER PUBLICATIONS

Chong, Nak Young et al., "Multioperator teleoperation of multirobot systems with time delay, Part 1", Presence: Teleoperators and Virtual Environments, Jun. 2002, 11(3): 277-291.*

JPO machine translation of JP 10-275015 (original JP document published Oct. 13, 1998).*

JPO machine translation of JP 2006-114053 (original JP document published Apr. 27, 2006).*

Kelly, Alonzo et al., "Real-time photorealistic virtualized reality interface for remote mobile robot control", International Symposium of Robotics Research (ISSR) 2009, Sep. 2009, 26 pages.*

Schulz, Dirk et al., "Robust visualization of navigation experiments with mobile robots over the Internet", Proc. of the 1999 IEEE/RSJ International Conference on Robots and Systems (IROS'99), Oct. 17-21, 1999, pp. 942-947.*

* cited by examiner

REMOTE OPERATION SYSTEM

TECHNICAL FIELD

The present disclosure relates to a remote operation system, and for example, which is applicable to an information presentation apparatus for an operator of a moving body configured to move via a remote operation.

BACKGROUND ART

There is a technology that, when a moving body is desired to be automatically operated in a disaster-stricken area or for a mine, a human operates the moving body from a remote location using a camera image. For example, in accordance with the technology disclosed in JP-A-2011-28495 (PTL 1), a camera is attached to a moving body so as to capture an image of the front of the moving body, an image acquired by the camera is displayed via wireless communication on an operation monitor for an operator at a remote location, and the operator operates the moving body while watching the monitor. In accordance with the technology disclosed in JP-A-10-275015 (PTL 2), complements between images are made to improve the quality of the transmitted images.

CITATION LIST

Patent Literature

PTL 1: JP-A-2011-28495
PTL 2: JP-A-10-275015

SUMMARY OF INVENTION

Technical Problem

When the moving body is remotely operated, there is a problem such as a delay of an image and information acquired from the moving body. For example, when the acquired image is an image captured one second earlier, an operation by the operator is late for preventing the moving body from colliding with an object or like that suddenly runs in front of the moving body even when the operation by the operator is immediately reflected in the moving body. Actually, an immediate transmission of an operation to the moving body cannot be expected. When a frame rate or a resolution is reduced due to narrowing down the amount of image data so as to prevent a delay of the image data, it is difficult to grasp motions of other moving bodies, which is a problem.

In accordance with the technology disclosed in PTL 1, adverse effect on an operation by a transmission delay of an image signal is reduced by correcting an image by combining information from another type of sensor having a small image delay. However, transmission delays exist on both an outbound path and an inbound path, and inherently, it is not possible to operate the moving body in real time.

The technology disclosed in PTL 2 offers a technique of providing a complemented image to an operator so as to improve the quality of an image having a low frame rate. However, although it is possible to expect an improvement in delay corresponding to the extent that the amount of data is reduced, the problem is not inherently solved.

An object of the present invention is to provide means for reducing an effect associated with an image delay, and safely avoiding a moving body which may become an obstacle when a moving body is operated from a remote location using an image transmitted from a camera provided in the moving body.

Solution to Problem

Hereinafter, a representative outline of the disclosure is simply described.

That is, in a remote processing system, an object recognition unit recognizes the model of an object and the movement speed of the object from the camera image, the motion of the object is estimated based on the model, and estimation results are displayed overlapped in the camera image.

Advantageous Effects of Invention

According to the remote operation apparatus system, even when the moving body is operated from the remote location and there is a delay present in a camera or a sensor of the moving body, it is possible to operate the moving body without instability associated with the delay, or an unstable motion occurring.

DESCRIPTION OF EMBODIMENTS

Figure 1:
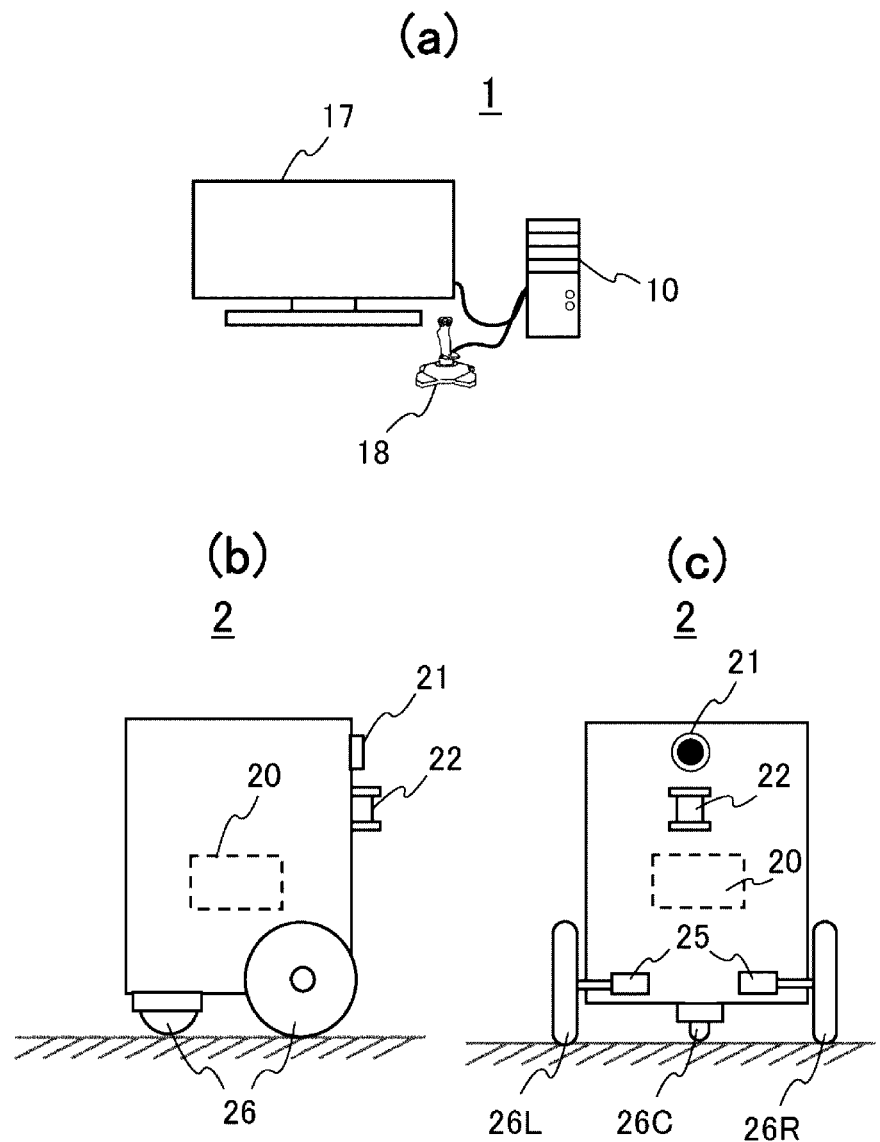
FIG. 1(a) is a view illustrating the remote operation apparatus according to the example.
FIG. 1(b) is a side view illustrating the moving body according to the example.
FIG. 1(c) is a front view of the moving body according to the example.

Hereinafter, an embodiment will be described.

(A) According to an embodiment, there is provided a remote operation system including: a moving body (2); and a remote operation apparatus (1), in which the moving body (2) includes: a camera (21) configured to capture an image of the front of the moving body; an environment sensor (22) configured to measure the distance from the moving body to a surrounding obstacle; a movement speed detection unit (23) configured to measure the movement speed and the turning speed of the moving body; and a wireless device (16b), in which the remote operation apparatus (1) includes: a monitor (17) configured to display an image from the camera; a calculating machine (10); and a wireless device (16a), in which information is transmitted and received between the wireless device (16b) of the moving body and the wireless device (16a) of the remote operation apparatus, and in which the calculating machine (10) includes: a database (12) in which image information regarding an obstacle and a moving body model are recorded; an obstacle motion estimation unit (11) configured to recognize an obstacle reflected in the image from the camera (21) and a moving body model for the obstacle, based on information from the environment sensor (22), the image from the camera (21), and information in the database (12), and to estimate the position of the obstacle after a set amount of time elapses; an estimated image generation unit (13) configured to generate a background image after the set amount of time elapses, based on the movement speed and the turning speed of the moving body, the background image being obtained by removing an image of the obstacle from the image from the camera (21); and an image output unit (14) configured to synthesize an image after the predetermined set amount of time elapses, based on outputs from the estimated image generation unit (13) and the obstacle motion estimation unit (11).

(B) In the remote operation system according to description (A), the obstacle motion estimation unit (11) may output a plurality of candidate positions and the intensity of estimation of a single obstacle after the predetermined set amount of time elapses, and the image output unit (14) may weight transparency and clearness for the plurality of candidate positions of the single obstacle in response to the intensity of estimation, and synthesize an image.

(C) In the remote operation system according to description (A), the obstacle motion estimation unit (11) may record estimated results for obstacles in time series, and add weighting factors to the estimated results in such a manner that the recorded estimated results are easily selected in subsequent estimation.

(D) In the remote operation system according to description (A), a stochastic process model may be adopted as the moving body model, the obstacle motion estimation unit (11) may express an estimated result of movement of the obstacle using a position and a covariance matrix, and the image output units (14) may gradate, and overlap the images of the obstacles on top of each other according to the covariance matrix when synthesizing an output image.

(E) In the remote operation system according to description (A), the moving body (2) may further include a wheel drive device (25) and wheels (26), and the movement speed detection unit (23) may obtain the rotational angular speed of each of the wheels (26) via the wheel drive device (25), and measure the movement speed and the turning speed of the moving body (2).

(F) In the remote operation system according to description (A), the remote operation apparatus (1) may further include an operation input device (18), the calculating machine (10) may further include an operation analysis unit (15), and the operation input device (18) may generate a command for movement of the moving body (2) which is sent to the operation analysis unit (15).

According to the remote operation system, even when the moving body is operated from the remote location, there is a delay in a transmission signal from the camera or the sensor of the moving body, and there is a delay in a transmission signal from the remote operation apparatus to the moving body, it is possible to operate the moving body without occurring an unstable or unsafe motion associated with the delays.

Hereinafter, an example will be described with reference to the accompanying drawings. In the following description, the same reference number is assigned to the same configuration element, and a repeated description of the configuration element will be omitted.

EXAMPLE

Configuration of Remote Operation System

The configuration of a remote operation apparatus and a moving body of the example will be described with reference to FIG. 1.

FIG. 1(a) is a view illustrating the remote operation apparatus according to the example. FIG. 1(b) is a side view illustrating the moving body according to the example. FIG. 1(c) is a front view of the moving body according to the example. A remote operation apparatus 1 is configured to include a calculating machine 10, a monitor 17, and an operation input device 18, all of which are connected to the calculating machine 10. The calculating machine 10 receives an image and environment information from a moving body 2 via wireless communication, performs image processing (to be described later), and outputs an image to the monitor 17. The operation input device 18 converts a human's operation into a signal, and transmits the signal to the calculating machine 10.

The moving body 2 is configured to include wheels 26 (26R, 26L, and 26C) for movement; a wheel drive device 25 configured to drive the wheels 26R and 26L; a camera 21 configured to acquire an image of the front of the moving body; an environment sensor 22 configured to acquire environment information; and a control device (moving body control device) 20 configured to control the entirety of the moving body. For example, a caster is adopted as the wheel 26C, and the wheel 26C can be turned omni-directionally. The moving body 2 receives an operation signal from the remote operation apparatus 1, and the moving body control device 20 operates the wheel drive device 25 in accordance with operation. For example, the environment sensor 22 is a two-dimensional laser range finder. The laser range finder is a device capable of scanning a surrounding environment as a two-dimensional plane, and obtaining the planar distance to an object and an azimuth angle of the object. The moving body 2 is moved by the wheel drive device 25, and a movement speed detection unit 23 built into the control device 20 calculates the movement speed and the turning angular speed of the moving body 2.

Subsequently, a system configuration will be described with reference to FIG. 2.

Figure 2:
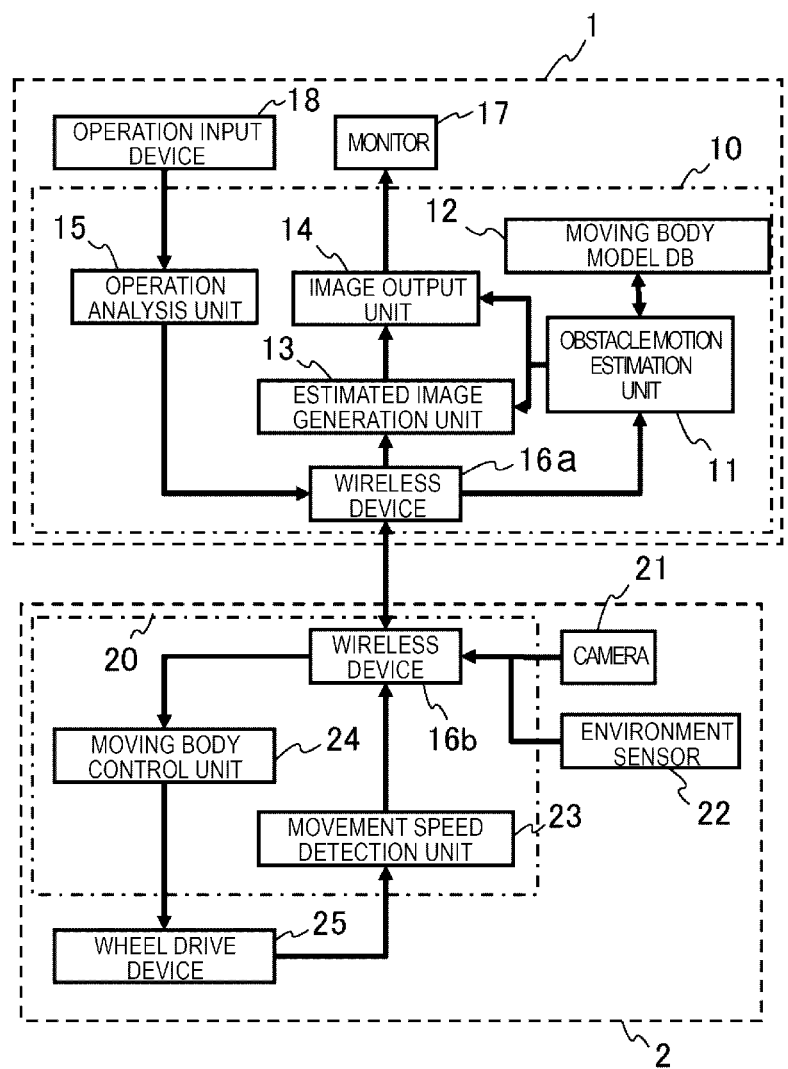
FIG. 2 is a diagram illustrating the system configuration of the moving body and the remote operation apparatus according to the example.

FIG. 2 is a diagram illustrating a system configuration of the moving body and the remote operation apparatus. The remote operation apparatus 1 is configured to include the monitor 17; the operation input device 18; and the calculating machine 10. The calculating machine 10 is configured to include an obstacle motion estimation unit 11; a moving body model database (DB) 12; an estimated image generation unit 13; an image output unit 14; an operation analysis unit 15; and a wireless device 16a. A human generates a command for movement of the moving body 2 which is sent to the operation analysis unit 15 by giving an operation to the operation input device 18. The wireless device 16a forms a pair with a wireless device 16b mounted in the moving body 2, and the wireless device 16a can transmit and receive information from the wireless device 16b.

The moving body 2 is configured to include the control device 20; the camera 21; the environment sensor 22; and the wheel drive device 25. The control device 20 controls the wheel drive device 25, and acquires the rotational angular speed of each of the wheels 26R and 26L via the wheel drive device 25. The control device 20 is configured to include the wireless device 16b that forms a pair with the wireless device 16a of the remote operation apparatus 1; the movement speed detection unit 23 configured to calculate the speed of the moving body 2; and a moving body control unit 24.

<Image Processing Flow>

Figure 3:
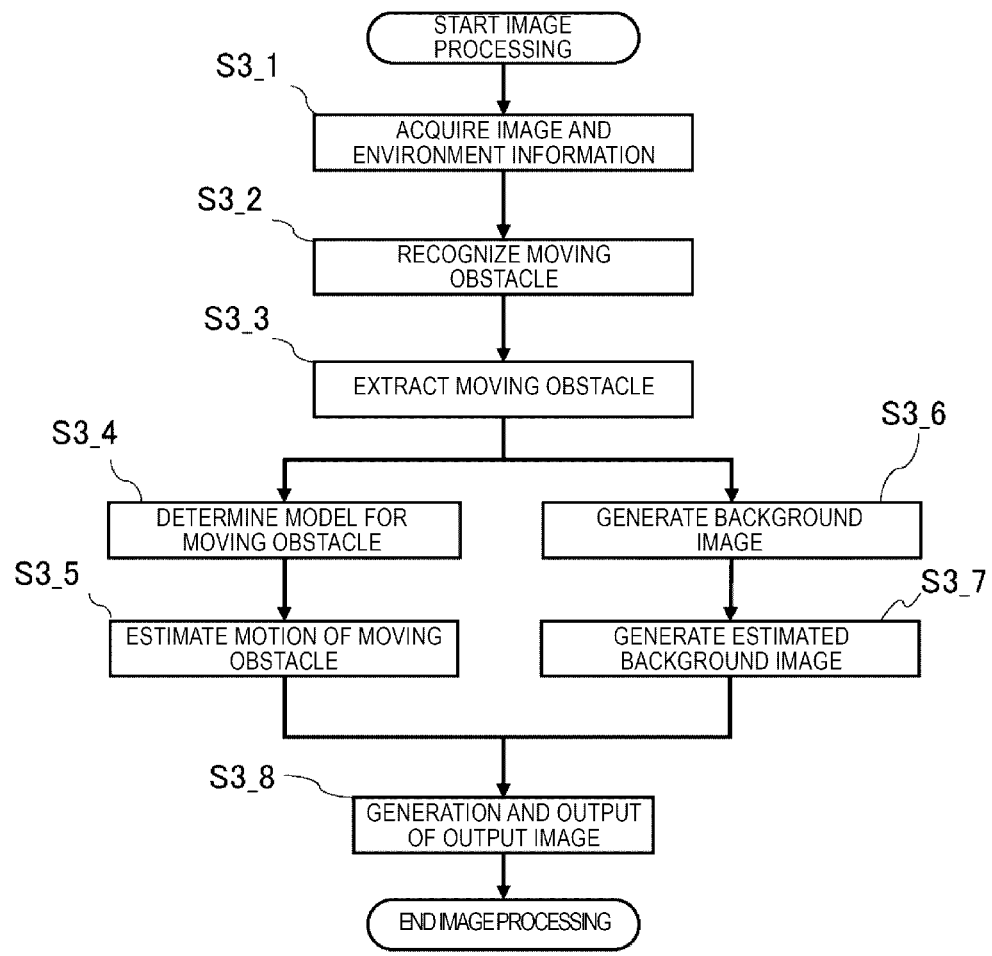
FIG. 3 is a flowchart illustrating image processing of the remote operation apparatus according to the example.

A description given hereinbelow with reference to FIG. 3 relates to an image processing flow of generating an image to be displayed on the monitor so that an operator can move the moving body. FIG. 3 is a flowchart illustrating image processing performed by the remote operation apparatus according to the example. The image processing is continuously executed at set intervals. Each sub-process will be described later.

(a) Acquiring Image and Environment Information (step S3_1)

In step S3_1, the calculating machine 10 acquires a camera image and environment sensor information from the moving body 2 via the wireless device 16.

(b) Recognizing Moving Obstacle (step S3_2)

In step S3_2, the obstacle motion estimation unit 11 recognizes a moving obstacle from the camera image and the environment sensor information acquired in step S3_1.

(c) Extracting Moving Obstacle (step S3_3)

In step S3_3, the obstacle motion estimation unit 11 extracts an image corresponding to an obstacle based on the position, the shape, and the speed of the recognized moving obstacle in the camera image, and notifies the estimated image generation unit 13 and the moving body model DB 12 of the extracted image.

(d) Determining Model for Moving Obstacle (step S3_4)

In step S3_4, the moving body model DB 12 determines a moving body model for the obstacle by comparing the image corresponding to the obstacle extracted in step S3_3 and a moving body database kept in the moving body model DB 12. There are several technologies disclosed to be used as a method in determining a moving body model as an obstacle from an image, and for example, a similar image retrieval technology (refer to JP-A-2006-114053) can be used. In the similar image retrieval technology, similarities between images are determined by extracting image information such as the color distribution, the shape, and the like of an image via a filter, converting the image information into the amount of image features as high-dimensional numerical information, and comparing the amount of image features. Since the moving body model DB 12 has a plurality of moving body images and the associated moving motion models as a database, the moving body model DB 12 determines the moving motion model for the obstacle by retrieving the database using similar images as keys. Typically, the moving body model is represented by Expression (1).

$$P=f(g,w,v,u) \quad \text{Expression 1}$$

Here, P is a vector indicative of the position of the obstacle after a time t seconds elapses, g is a vector indicative of the position of the obstacle, w is a vector indicative of the direction, v is a vector indicative of the movement speed, and u is a vector indicative of the turning angular speed. For example, in a moving body such as a bicycle or an automobile which can not discontinuously change a travelling direction, when w is constant over the time t, u and v are a function of t, and the position P after a time k elapses is represented by Expression (2).

$$P=g+\int_0^k \arg(w+u)v dt \quad \text{Expression 2}$$

The moving body model DB 12 notifies the obstacle motion estimation unit 11 of the determined moving body model and the degree of similarity. When there are a plurality of similar images, and a plurality of moving body model candidates, the moving body model DB 12 notifies the obstacle motion estimation unit 11 of the plurality of candidates.

(e) Estimating Motion of Moving Obstacle (step S3_5)

In step S3_5, the obstacle motion estimation unit 11 calculates a future position after a set amount of time q, based on the moving body model and the position and the speed of the obstacle measured in step S3_3. When there are a plurality of moving body models for the obstacle, the obstacle motion estimation unit 11 calculates the position of the obstacle for each of the moving body models. Subsequently, the obstacle motion estimation unit 11 notifies the image output unit 14 of the image of the obstacle extracted in step S3_4, the calculated future position of the obstacle, and the degree of similarity (the intensity of estimation) used for calculating the position.

(f) Generating Background Image (step S3_6)

In step S3_6, based on the image corresponding to the obstacle extracted in step S3_3 and the camera image, the estimated image generation unit 13 generates a background image from which the obstacle is extracted, and in which only objects considered to be standing bodies are reflected. A portion from which the obstacle is extracted is complemented based on the image surrounding the obstacle.

(g) Generating Estimated Background Image (step S3_7)

In step S3_7, the estimated image generation unit 13 generates a future background image after the set amount of time q elapses, based on the movement speed of the moving body 2. A method of generating the future background image will be described hereinbelow. The height from the ground and the angle of view of the camera 21 in the moving body 2 are already known. It is possible to recognize a road surface based on the assumption that a foremost color indicates a road surface in the image not containing the moving body 2. When the road surface is assumed to be horizontal, it is possible to calculate the distance from the moving body 2 to the road surface in the image via the theory of triangulation using the angle of view and the height of the camera. When a moving distance L of the moving body 2 after the time q is simply assumed to be the multiplication of a current movement speed by q, it is possible to acquire a background image when the moving body 2 travels the distance L by removing a road surface within the distance L and images other than a rectangular region circumscribed to the road surface. It is possible to generate the future background image after the time q elapses by performing affine transformation on the acquired image and enlarging the acquired image. The acquired estimated background image is transmitted to the image output unit 14.

(h) Generation and Output of Output Image (step S3_8)

In step S3_8, the image output unit 14 synthesizes an image of the obstacle in the estimated background image based on the assumption that the extracted obstacle is present at the estimated position. When a plurality of positions of the synthesized obstacle are present, the transparency of the synthesized obstacle is changed (weighted) in response to the degree of similarity (the intensity of estimation), and the positions are collectively synthesized. Accordingly, it is possible to display the obstacle transparently or clearly in response to the accuracy of estimation. The synthesized image is output to the monitor 17, and the processing ends.

<Method of Recognizing Moving Obstacle>

Hereinafter, a method of recognizing the position, the speed, and the shape of a moving obstacle by the obstacle motion estimation unit 11 will be described.

For example, the following method (refer to JP-A-2008-65755) is used to calculate an obstacle. In this method, first, rapid changing points of a distance value, acquired from the environment sensor 22, that is, a laser scanner, with respect to an angle at a time t are detected, and a data array for a group of continuous points is divided and segmented. Accordingly, the amount of features such as a representative position, for example, the center of each segment at the time t and a shape is acquired. Subsequently, the same calculation is performed at a time t+Δt, and the amount of features for each segment is acquired. Here, the amount of features for a segment at the time t is compared with the amount of features for a segment acquired at the time t+Δt, the segments having the similar amount of features are recognized as the same obstacle, and the moving direction and the speed of the obstacle are calculated from the amount of changes in representative position. If a plane measured by the environment sensor 22 is associated with an image from the camera 21 via the pre-calibration thereof, the position of the recognized obstacle in the image becomes apparent, and thereby part of the obstacle can be recognized by a polygonal line in response to a distance in the camera image. It is possible to acquire an image of the obstacle by applying an environment color to the outside of the polygonal line, and extracting an image of a region surrounded by the environment color. Since the process is performed for each segment, it is possible to recognize a plurality of obstacles. The obstacle detection unit 24 can detect the position, the speed, and the shape of a single or a plurality of obstacles via this process.

<Method of Measuring Speed of Moving Body>

Hereinafter, a method of measuring the speed of the moving body 2 by the movement speed detection unit 23 will be described. The movement speed detection unit 23 acquires a rotational angular speed $d\phi_R$ of the wheel 26R and a rotational angular speed $d\phi_L$ of the wheel 26L via the wheel drive device 25. When the acquired rotational angular speeds and a wheel base T of the moving body 2 which is already known are used, a movement speed V and a turning angular speed W of the moving body 2 are represented by Expression (3).

$$\begin{cases} V = (d\phi_R + d\phi_L)/2 \\ W = (d\phi_R - d\phi_L)/T \end{cases} \quad \text{Expression 3}$$

Even when it takes a certain amount of time required to transmit a camera image and a moving obstacle is present, it is possible to reduce instability and a risk associated with a transmission delay and to safely and effectively operate the remote operation apparatus and the moving body 2 having the aforementioned configuration by estimating the movement of the obstacle and the movement of the moving body 2, generating an estimated image based on a current image, and presenting the estimated image to an operator via a monitor.

In addition, it is possible to reduce instability and a risk associated with a transmission delay in an image and an operation signal, and to safely and effectively operate the remote operation apparatus and the moving body 2 by estimating the movement of the obstacle and the movement of the moving body 2, generating an estimated image based on a current image, and presenting the estimated image to an operator via a monitor while taking a transmission delay in the operation signal from the remote operation apparatus to the moving body into consideration.

Modification Example 1

The stochastic process model may be used as a moving body model for an obstacle. When the stochastic process model is adopted, it is possible to intuitively present the reliability of an estimated result of movement of the obstacle to an operator by expressing the estimated result of movement of the obstacle output in step S3_5 using a position and a covariance matrix, and gradating and overlapping the images of the obstacles on top of each other according to the covariance matrix when synthesizing an output image in step S3_8.

Modification Example 2

Only movement information regarding an obstacle is used to determine a movement body model for an obstacle; however, the obstacle motion estimation unit 11 may record the movement speed and the turning speed of the obstacle in time series, and compare the time series movement speed and the time series turning speed with the moving body model candidates, and thereby candidates may be narrowed down. When moving body model candidates (estimated results) for each obstacle are also recorded in time series, and the recorded estimated results are easily selected in subsequent estimation, it is possible to prevent the moving body model from changing at every interval of image processing by adding the degree of similarity to the same candidate as an immediate proceeding moving body model.

The invention made by the inventor has been specifically described based on the examples; however, the invention is not limited to the examples, and various modifications can be made to the invention.

REFERENCE SIGNS LIST

1: remote operation apparatus
2: moving body
10: calculating machine
20: control device
21: camera
22: environment sensor
25: wheel drive device
26: wheel

The invention claimed is:
1. A remote operation system comprising:
a moving body; and
a remote operation apparatus,
wherein the moving body includes:
a camera configured to capture an image of the front of the moving body;
an environment sensor configured to measure the distance from the moving body to a surrounding obstacle;
a movement speed detection unit configured to measure the movement speed and the turning speed of the moving body; and
a wireless device,
wherein the remote operation apparatus includes:
a monitor configured to display an image from the camera;
a calculating machine; and
a wireless device,
wherein information is transmitted and received between the wireless device of the moving body and the wireless device of the remote operation apparatus, and
wherein the calculating machine includes:
a database in which image information regarding an obstacle and a moving body model are recorded;
an obstacle motion estimation unit configured to recognize an obstacle captured in the image from the camera and a moving body model for the obstacle, based on information from the environment sensor, the image from the camera, and information in the database, and to estimate the position of the obstacle after a set amount of time elapses;
an estimated image generation unit configured to generate a background image after the set amount of time elapses, based on the movement speed and the turning speed of the moving body, the background image being obtained by removing an image of the obstacle from the image from the camera; and
an image output unit configured to synthesize an image after the predetermined set amount of time elapses, based on outputs from the estimated image generation unit and the obstacle motion estimation unit.

2. The remote operation system according to claim 1,
wherein the obstacle motion estimation unit outputs a plurality of candidate positions and the intensity of estimation of a single obstacle after the predetermined set amount of time elapses, and
wherein the image output unit weights transparency and clearness for the plurality of candidate positions of the single obstacle in response to the intensity of estimation, and synthesizes an image.

3. The remote operation system according to claim 1,
wherein the obstacle motion estimation unit records estimated results for obstacles in time series, and adds weighting factors to the estimated results in such a manner that the recorded estimated results are easily selected in subsequent estimation.

4. The remote operation system according to claim 1,
wherein a stochastic process model is adopted as the moving body model,
wherein the obstacle motion estimation unit expresses an estimated result of movement of the obstacle using a position and a covariance matrix, and
wherein the image output unit gradates, and overlaps the images of the obstacles on top of each other according to the covariance matrix when synthesizing an output image.

5. The remote operation system according to claim 1,
wherein the moving body further includes a wheel drive device and wheels, and
wherein the movement speed detection unit obtains the rotational angular speed of each of the wheels via the wheel drive device, and measures the movement speed and the turning speed of the moving body.

6. The remote operation system according to claim 1,
wherein the remote operation apparatus further includes an operation input device,
wherein the calculating machine further includes an operation analysis unit, and
wherein the operation input device generates a command for movement of the moving body which is sent to the operation analysis unit.

7. A remote operation system comprising:
a moving body; and
a remote operation apparatus,
wherein the moving body includes:
a camera configured to capture an image of the front of the moving body;
an environment sensor configured to measure the distance from the moving body to a surrounding obstacle;
a control device;
a wireless device;
wheels; and
a wheel drive device configured to drive the wheels,
wherein the remote operation apparatus includes:
a monitor configured to display an image from the camera in the moving body;
a calculating machine; and
a wireless device,
wherein information is transmitted and received between the wireless device of the moving body and the wireless device of the remote operation apparatus,
wherein the control device has a movement speed detection unit configured to measure the movement speed and the turning angular speed of the moving body based on information from the wheel drive device, and
wherein the calculating machine includes:
a database in which image information regarding an obstacle and a moving body model are recorded;
an obstacle motion estimation unit configured to recognize an obstacle captured in the image from the camera and a moving body model for the obstacle, based on information from the environment sensor, the image from the camera, and information in the database, and to estimate the position of the obstacle after a set amount of time elapses;
an estimated image generation unit configured to generate a background image when the set amount of time elapses, based on the movement speed and the turning angular speed of the moving body, the background image being obtained by removing an image of the obstacle from the image from the camera; and
an image output unit configured to synthesize an image after the predetermined set amount of time elapses, based on outputs from the estimated image generation unit and the obstacle motion estimation unit.

8. The remote operation system according to claim 7,
wherein the obstacle motion estimation unit outputs a plurality of candidate positions and the intensity of estimation of a single obstacle after the predetermined set amount of time elapses, and
wherein the image output unit weights transparency and clearness for the plurality of candidate positions of the single obstacle in response to the intensity of estimation, and synthesizes an image.

9. The remote operation system according to claim 7,
wherein the obstacle motion estimation unit records estimated results for obstacles in time series, and adds weighting factors to the estimated results in such a manner that the recorded estimated results are easily selected in subsequent estimation.

10. The remote operation system according to claim 7,
wherein a stochastic process model is adopted as the moving body model,
wherein the obstacle motion estimation unit expresses an estimated result of movement of the obstacle using a position and a covariance matrix, and
wherein the image output unit gradates, and overlaps the images of the obstacles on top of each other according to the covariance matrix when synthesizing an output image.

11. The remote operation system according to claim 7,
wherein the remote operation apparatus further includes an operation input device,
wherein the calculating machine further includes an operation analysis unit, and
wherein the operation input device generates and sends a command for movement of the moving body to the operation analysis unit.

* * * * *